(12) United States Patent
Chandwani et al.

(10) Patent No.: US 10,075,531 B2
(45) Date of Patent: Sep. 11, 2018

(54) CONNECTING PUBLIC CLOUD APPLICATIONS WITH PRIVATE NETWORK RESOURCES

(71) Applicant: Microsoft Technology Licensing, LLC., Redmond, WA (US)

(72) Inventors: Santosh Chandwani, Redmond, WA (US); Jayteerth Narasingrao Katti, Redmond, WA (US); Jaroslav Dunajsky, Redmond, WA (US); Aleksandar Boljanac, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 358 days.

(21) Appl. No.: 14/708,867

(22) Filed: May 11, 2015

(65) Prior Publication Data

US 2015/0326579 A1 Nov. 12, 2015

Related U.S. Application Data

(60) Provisional application No. 61/992,073, filed on May 12, 2014.

(51) Int. Cl.
*G06F 15/173* (2006.01)
*H04L 29/08* (2006.01)
*H04L 29/06* (2006.01)

(52) U.S. Cl.
CPC ........ *H04L 67/141* (2013.01); *H04L 63/0281* (2013.01); *H04L 63/10* (2013.01);
(Continued)

(58) Field of Classification Search
CPC ......... H04L 29/06; H04L 29/08; H04L 63/10; H04L 67/02; H04L 63/0281; H04L 63/08; H04L 67/10; H04L 67/141; H04L 67/28
(Continued)

(56) References Cited

U.S. PATENT DOCUMENTS 9,201,704 B2 * 12/2015 Chang ................. G06F 9/45558
9,344,487 B2 * 5/2016 Barzilay ................. H04L 67/10
(Continued)

FOREIGN PATENT DOCUMENTS

| EP | 2228968 A2 | 9/2010 |
| EP | 2381363 | 10/2011 |
| GB | 2323757 A | 9/1998 |

OTHER PUBLICATIONS

"International Search Report & Written Opinion Received for PCT Patent Application No. PCT/US2015/030223", dated Sep. 16, 2015, 12 pages.
(Continued)

*Primary Examiner* — Phuoc Nguyen
(74) *Attorney, Agent, or Firm* — Workman Nydegger

(57) ABSTRACT

The automatic establishing of the connection between the public cloud and the on-premises resource. First, the bridging infrastructure is automatic accessed. The bridging infrastructure is configured to interact with a user system within the private network using a first control. For instance, it is this first control that may be represented as an executable within the configuration package used in provisioning the connection. A second control is provided to the application running in the public cloud. The second control is structured such that the at least one application may be used to securely connect via the bridging infrastructure with an on-premises resource of the private network.

18 Claims, 7 Drawing Sheets

(52) U.S. Cl.
CPC .............. *H04L 67/02* (2013.01); *H04L 67/10* (2013.01); *H04L 67/28* (2013.01); *H04L 67/2809* (2013.01); *H04L 63/08* (2013.01)

(58) Field of Classification Search
USPC ........................................................ 709/225
See application file for complete search history.

(56) References Cited

U.S. PATENT DOCUMENTS

| | | | | |
|---|---|---|---|---|
| 9,424,062 | B1* | 8/2016 | Mummidi | G06F 9/45558 |
| 2005/0273849 | A1 | 12/2005 | Araujo et al. | |
| 2009/0157627 | A1* | 6/2009 | Arthursson | G06F 9/45504 |
| 2012/0096171 | A1* | 4/2012 | Suit | H04L 12/6418 709/227 |
| 2012/0179820 | A1 | 7/2012 | Ringdahl et al. | |
| 2012/0281706 | A1 | 11/2012 | Agarwal et al. | |
| 2012/0281708 | A1 | 11/2012 | Chauhan et al. | |
| 2012/0311108 | A1 | 12/2012 | Brandwine et al. | |
| 2012/0331528 | A1 | 12/2012 | Fu et al. | |
| 2013/0067550 | A1 | 3/2013 | Chen et al. | |
| 2013/0142201 | A1 | 6/2013 | Kim et al. | |
| 2014/0108665 | A1* | 4/2014 | Arora | H04L 67/141 709/227 |
| 2014/0280961 | A1* | 9/2014 | Martinez | H04L 41/5054 709/226 |
| 2014/0366155 | A1* | 12/2014 | Chang | G06F 21/10 726/27 |
| 2015/0326672 | A1 | 11/2015 | Chandwani et al. | |

OTHER PUBLICATIONS

"Second Written Opinion Issued in PCT Application No. PCT/US2015/030222", dated Apr. 15, 2016, 7 pages.
"Second Written Opinion Issued in PCT Application No. PCT/US2015/030223", dated Apr. 15, 2016, 8 pages.
"International Search Reprt & Written Opinion Issued in PCT Application No. PCT/US2015/030222", dated Sep. 23, 2015, 11 Pages.
"Hybrid Connections (Preview)", Published on: May 12, 2014 Available at: http://blogs.msdn.com/b/biztalk_server_team_blog/archive/2014/05/13/hybrid-connections-preview.aspx.
"Microsoft IT Evolves its Network for Public Cloud Connectivity", Published on: Apr. 2014 Available at: http://technet.microsoft.com/en-us/library/dn690280.aspx.
"AWS Direct Connect", Published on: Mar. 2, 2014 Available at: https://aws.amazon.com/directconnect/?nc1=h_l2_cn.
Annapureddy, Koushik, "Security Challenges in Hybrid Cloud Infrastructures", In Proceedings of T-110.5290 Seminar on Network Security, Nov. 2010, 6 pages.
"International Preliminary Report on Patentability Issued in PCT Application No. PCT/US2015/030223", dated Jul. 29, 2016, 9 Pages.
Office Action dated May 8, 2017 cited in U.S. Appl. No. 14/708,859.
"Office Action Issued in European Patent Application No. 15726432.6", dated Jan. 5, 2018, 5 Pages.
"International Preliminary Report on Patentability Issued in PCT Application No. PCT/US2015/030222", dated Jul. 29, 2016, 7 Pages.

\* cited by examiner

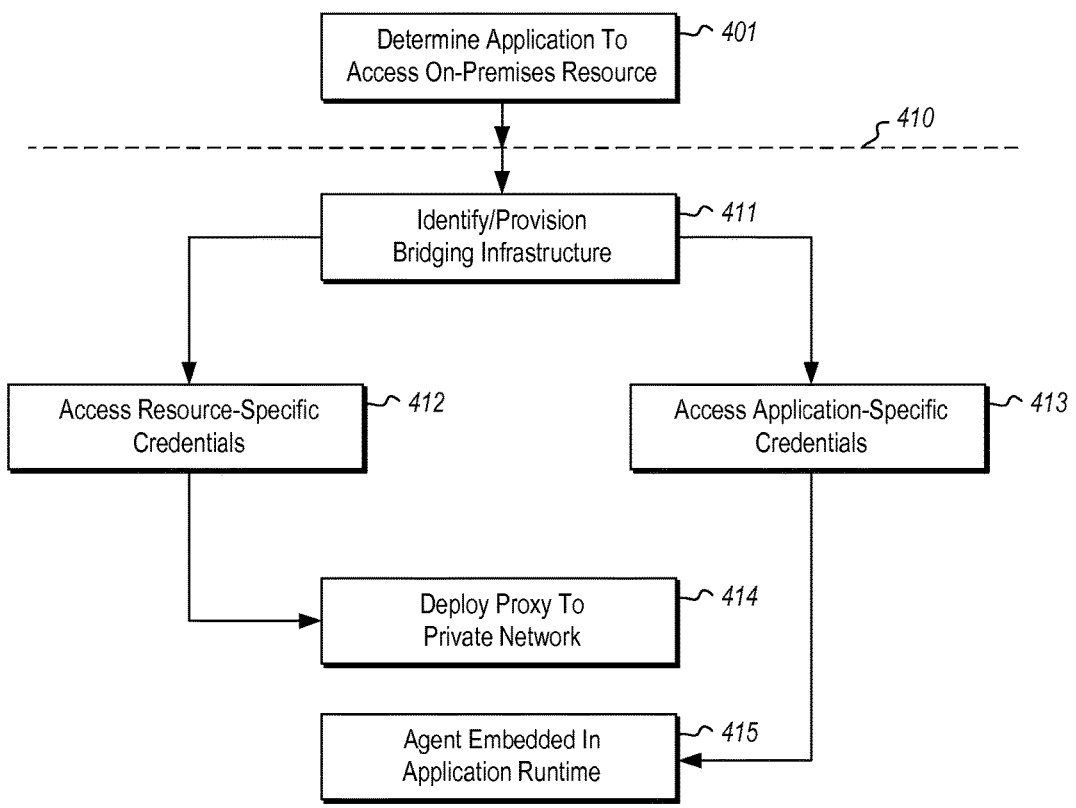

CONNECTING PUBLIC CLOUD APPLICATIONS WITH PRIVATE NETWORK RESOURCES

CROSS-REFERENCE TO RELATED APPLICATIONS

This application claims the benefit under 35 U.S.C. § 119(e) of U.S. provisional patent application Ser. No. 61/992,073, filed May 12, 2014, which provisional patent application is hereby incorporated herein by reference in its entirety.

BACKGROUND

Public cloud hosting platforms host applications that use resources, such as databases and services. Conventionally, the resources used by such applications hosted in the public cloud are also located within the public cloud. If the resources are located within a private network, then those resources would be moved to the public cloud in order to be used by such applications. However, for security, compliance or legal reasons, some resources cannot be moved to the public cloud.

In order to allow access to these resources on private networks, network administrators are often required to open ports in their firewalls to allow traffic from the internet into their network, deploy proxies and/or gateways in the network DeMilitarized Zone (DMZ) that forward external traffic to the resource, or use a Virtual Private Network (VPN) to connect the application to their private network.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiments described herein relate to the establishment of a connection between a public cloud and an on-premises resource in a private network using a bridging infrastructure. Examples of on-premises resources include databases, data stores, web services, application servers, and so forth. The bridging infrastructure is part of the public cloud infrastructure and may be provisioned or allocated by a service designed for this purpose. Select elements of this bridging infrastructure may be allocated or created on demand if required.

Provisioning may occur by identifying a bridging infrastructure that provides access to the on-premises resource. Credentials required to access this bridging infrastructure are then accessed for later use in connecting to the bridging infrastructure. Application-specific credentials with send rights are securely provided to the application runtime for the application that needs to access the resource on the private network. The application-specific credentials are usable by an agent embedded into the runtime of the application on the public cloud to connect to the identified bridging infrastructure. The user deploys a proxy on the private network that provides secure connectivity between the on-premises resource on that private network and the bridging infrastructure using the resource-specific credentials. The proxy is located inside the private network and uses outbound communication from the private network to connect to the bridging infrastructure. Thus, the network administrators do not have to open firewall ports or establish VPN connections for the proxy to connect to the bridging infrastructure.

At least some embodiments described herein relate to the automatic establishing of the connection between an application in the public cloud and the on-premises resource. First, the bridging infrastructure is automatically accessed. The bridging infrastructure is configured to interact with a first control within the private network. For instance, this first control may be represented as a proxy hosted on the private network and that is deployed by an executable within a configuration package used in provisioning the connection. The proxy securely connects to the bridging infrastructure and forwards traffic between the bridging infrastructure and the on-premises resource. The bridging infrastructure accepts incoming connections from the first control on the private network. The first control securely connects to the bridging infrastructure using outbound connectivity from the corporate network.

In some embodiments, the bridging infrastructure may store metadata about the on-premises resource to which it provides access. The first control may access this metadata from the bridging infrastructure or may be separately configured with the network address of the on-premises resource on the private network. The first control then forwards traffic between the application on the public cloud and the specified on-premises resource. A second control is provided to the application running in the public cloud. The second control is structured such that the at least one application may be used to securely connect via the bridging infrastructure with an on-premises resource of the private network.

In one example, the second control may be realized as an agent embedded in the application runtime, which control intercepts messages from the application destined for the on-premises resource, frames it over an appropriate network message or tunneling protocol and re-directs them over the bridging infrastructure to the first control, which in turn forwards it to the on-premises resource. The response follows the reverse path back to the application on the public cloud.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which:

FIG. 3 illustrates three temporal stages associated with the bridging infrastructure;

FIG. 4 illustrates a flowchart of a method for provisioning a connection between a public cloud and an on-premises resource in a private network;

DETAILED DESCRIPTION

Figure 1:
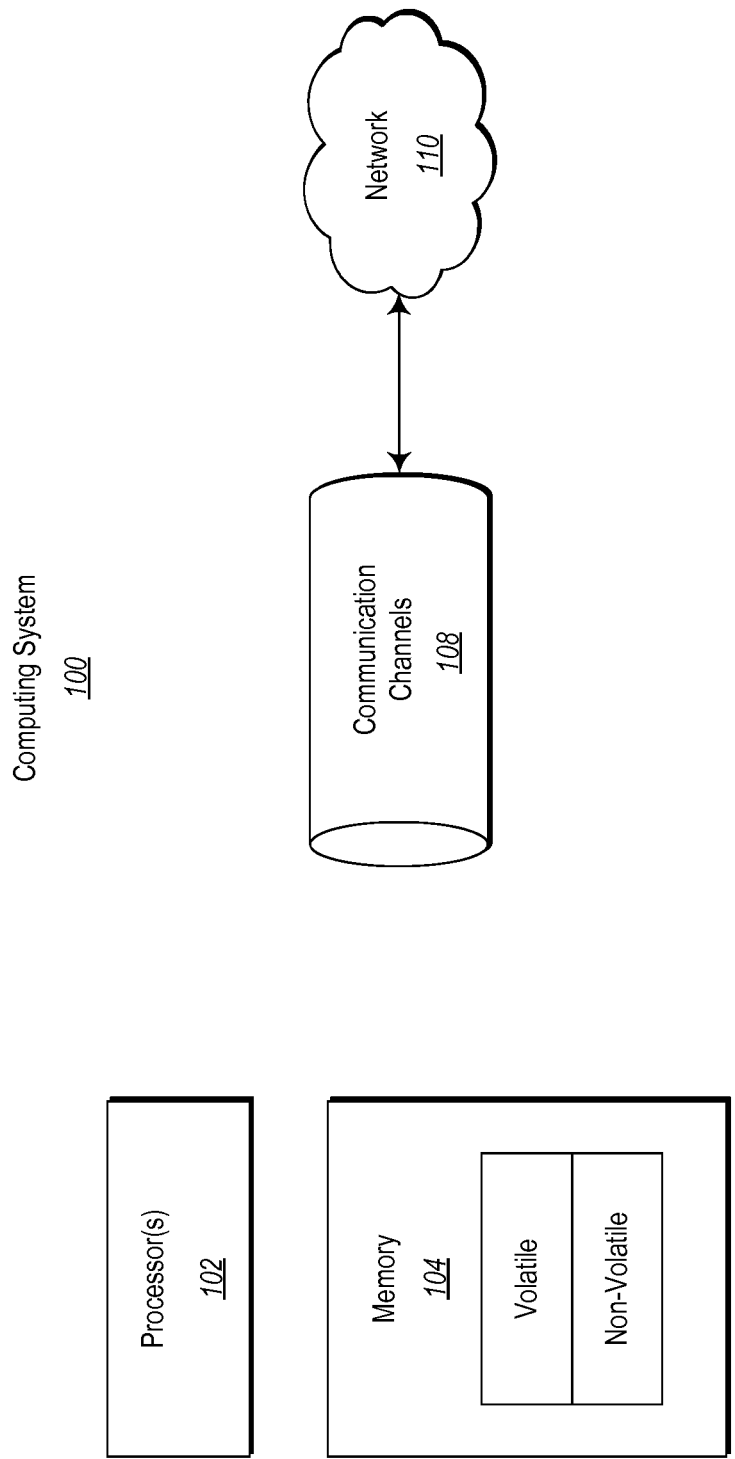
FIG. 1 abstractly illustrates a computing system in which some embodiments described herein may be employed.

At least some embodiments described herein relate to the establishment of a connection between a public cloud and an on-premises resource in a private network using a bridging infrastructure. Examples of on-premises resources include databases, data stores, web services, application servers, and so forth. The bridging infrastructure is part of the public cloud infrastructure and may be provisioned or allocated by a service designed for this purpose. Select elements of this bridging infrastructure may be allocated or created on demand if required.

Provisioning may occur by identifying a bridging infrastructure that provides access to the on-premises resource. Credentials used to access this bridging infrastructure are then accessed for later use in connecting to the bridging infrastructure. Application-specific credentials with send rights are securely and automatically provided to the application runtime for the application that needs to access the resource on the private network. The application-specific credentials are usable by an agent embedded into the runtime of the application on the public cloud to connect to the identified bridging infrastructure. The user deploys a proxy on the private network that can provide secure connectivity between the on-premises resource on that private network and the bridging infrastructure using the resource-specific credentials. The proxy is located inside the private network and uses outbound communication from the private network to connect to the bridging infrastructure. Thus, the network administrators do not have to open firewall ports or establish VPN connections for the proxy to connect to the bridging infrastructure.

At least some embodiments described herein relate to the automatic establishing of the connection between an application in the public cloud and the on-premises resource. First, the bridging infrastructure is automatically accessed. The bridging infrastructure is configured to interact with a first control within the private network. For instance, this first control may be represented as a proxy hosted on the private network and deployed by an executable within a configuration package used in provisioning the connection. The proxy securely connects to the bridging infrastructure and forwards traffic between the bridging infrastructure and the on-premises resource. The bridging infrastructure accepts incoming connections from the first control on the private network. The first control securely connects to the bridging infrastructure using outbound connectivity from the corporate network.

In some embodiments, the bridging infrastructure may store metadata about the on-premises resource to which it provides access. The first control may access this metadata from the bridging infrastructure or may be separately configured with the network address of the on-premises resource on the private network. The first control then forwards traffic between the application on the public cloud and the specified on-premises resource. A second control is provided to the application running in the public cloud. The second control is structured such that the at least one application may be used to securely connect via the bridging infrastructure with an on-premises resource of the private network.

In one example, the second control may be realized as an agent embedded in the application runtime, which intercepts messages from the application destined for the on-premises resource, frames it over an appropriate network message or tunneling protocol and re-directs them over the bridging infrastructure to the first control. The first control upon receiving the framed message, removes the framing and forwards the original message to the on-premises resource. The response from the on-premises resource follows the reverse path back to the application on the public cloud.

Some introductory discussion of a computing system will be described with respect to FIG. 1. Then, the principles of provisioning and utilizing a bridging infrastructure in order to allow a public cloud to use resources in a private network will be described with respect to subsequent Figures.

Computing systems are now increasingly taking a wide variety of forms. Computing systems may, for example, be handheld devices, appliances, laptop computers, desktop computers, mainframes, distributed computing systems, datacenters, or even devices that have not conventionally been considered a computing system, such as wearables (e.g., glasses). In this description and in the claims, the term "computing system" is defined broadly as including any device or system (or combination thereof) that includes at least one physical and tangible processor, and a physical and tangible memory capable of having thereon computer-executable instructions that may be executed by the processor. The memory may take any form and may depend on the nature and form of the computing system. A computing system may be distributed over a network environment and may include multiple constituent computing systems.

As illustrated in FIG. 1, in its most basic configuration, a computing system 100 typically includes at least one hardware processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "executable module" or "executable component" can refer to software objects, routines, or methods that may be executed on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors (of the associated computing system that performs the act) direct the operation of the computing system in response to having executed computer-executable instructions. For example, such computer-executable instructions may be embodied on one or more computer-readable media that form a computer program product. An example of such an operation involves the manipulation of data. The computer-executable instructions (and the manipulated data) may be stored in the memory 104 of the computing system 100. Computing system 100 may also contain communication channels 108 that allow the computing system 100 to communicate with other computing systems over, for example, network 110. The computing system 100 also includes a display, which may be used to display visual representations to a user.

Embodiments described herein may comprise or utilize a special purpose or general-purpose computing system including computer hardware, such as, for example, one or more processors and system memory, as discussed in greater detail below. Embodiments described herein also include physical and other computer-readable media for carrying or storing computer-executable instructions and/or data structures. Such computer-readable media can be any available media that can be accessed by a general purpose or special purpose computing system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: storage media and transmission media.

Computer-readable storage media includes RAM, ROM, EEPROM, CD-ROM or other optical disk storage, magnetic disk storage or other magnetic storage devices, or any other physical and tangible storage medium which can be used to store desired program code means in the form of computer-executable instructions or data structures and which can be accessed by a general purpose or special purpose computing system.

A "network" is defined as one or more data links that enable the transport of electronic data between computing systems and/or modules and/or other electronic devices. When information is transferred or provided over a network or another communications connection (either hardwired, wireless, or a combination of hardwired or wireless) to a computing system, the computing system properly views the connection as a transmission medium. Transmissions media can include a network and/or data links which can be used to carry desired program code means in the form of computer-executable instructions or data structures and which can be accessed by a general purpose or special purpose computing system. Combinations of the above should also be included within the scope of computer-readable media.

Further, upon reaching various computing system components, program code means in the form of computer-executable instructions or data structures can be transferred automatically from transmission media to storage media (or vice versa). For example, computer-executable instructions or data structures received over a network or data link can be buffered in RAM within a network interface module (e.g., a "NIC"), and then eventually transferred to computing system RAM and/or to less volatile storage media at a computing system. Thus, it should be understood that storage media can be included in computing system components that also (or even primarily) utilize transmission media.

Computer-executable instructions comprise, for example, instructions and data which, when executed at a processor, cause a general purpose computing system, special purpose computing system, or special purpose processing device to perform a certain function or group of functions. The computer executable instructions may be, for example, binaries or even instructions that undergo some translation (such as compilation) before direct execution by the processors, such as intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computing system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, datacenters, wearables (such as glasses) and the like. The invention may also be practiced in distributed system environments where local and remote computing systems, which are linked (either by hardwired data links, wireless data links, or by a combination of hardwired and wireless data links) through a network, both perform tasks. In a distributed system environment, program modules may be located in both local and remote memory storage devices.

In accordance with the principles described herein, applications that are hosted on public clouds communicate with resources on remote private networks just as if the application was running locally on that private network. Furthermore, such connectivity may be configured with just a few gestures. By having an agent embedded in the runtime on which the application is hosted, such connectivity may be established with literally a few configuration gestures involving 1) creating a logical representation of the remote resource with the associated bridging infrastructure, 2) installation of a proxy for that remote resource on the private network that automatically connects to the bridging infrastructure and 3) automatically configuring the agent in the application runtime to intercept the traffic for the remote resource and directing it to the bridging infrastructure. One unique capability of this mechanism is that entire application groupings (or tiers) such as the web or mobile tiers can be moved from private networks to public clouds without any code or configuration change while keeping other critical tiers such as databases on the secure private networks.

In this description and the following claims, "cloud computing" is defined as a model for enabling on-demand network access to a shared pool of configurable computing resources (e.g., networks, servers, storage, applications, and services). The definition of "cloud computing" is not limited to any of the other numerous advantages that can be obtained from such a model when properly deployed.

For instance, cloud computing is currently employed in the marketplace so as to offer ubiquitous and convenient on-demand access to the shared pool of configurable computing resources. Furthermore, the shared pool of configurable computing resources can be rapidly provisioned via virtualization and released with low management effort or service provider interaction, and then scaled accordingly.

A cloud computing model can be composed of various characteristics such as on-demand self-service, broad network access, resource pooling, rapid elasticity, measured service, and so forth. A cloud computing model may also come in the form of various service models such as, for example, Software as a Service ("SaaS"), Platform as a Service ("PaaS"), and Infrastructure as a Service ("IaaS"). The cloud computing model may also be deployed using different deployment models such as private cloud, community cloud, public cloud, hybrid cloud, and so forth. In this description and in the claims, a "cloud computing environment" is an environment in which cloud computing is employed.

Figure 2:
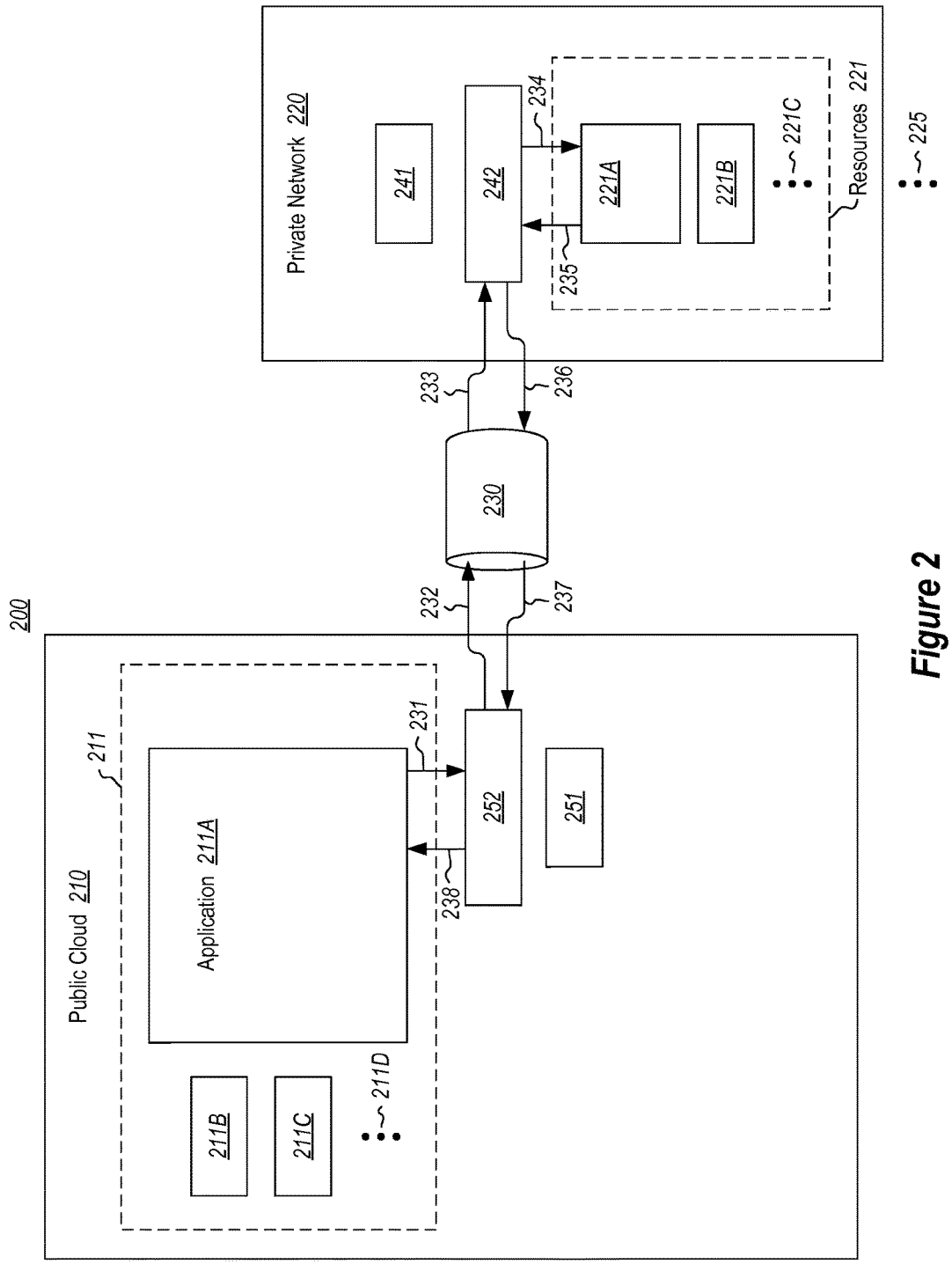
FIG. 2 illustrates an environment in which the principles described herein may operate, and which includes a public cloud and a private network interconnected with a bridging infrastructure.

FIG. 2 illustrates an environment 200 in which the principles described herein may operate. The environment 200 includes a public cloud 210 and a private network 220. The public cloud 210 has operating therein a variety of applications 211. For instance, the public cloud 210 is illustrated as operating therein applications 211A, 211B and 211C, although the ellipses 211D represents flexibility in the number of applications operated by a public cloud 210. The application 211A is illustrated slightly larger as it will be used as a primary example describe herein. The public cloud 210 may implement a cloud computing model that has multiple customers—hence the term "public".

The private network 220 has operating therein on-premises resources 221. For instance, the on-premises resources 221 are illustrated as including resources 221A and 221B, although the ellipses 221C represents that there may be a large variety of resources operating within the private network 220. The resource 221A is illustrated slightly larger as it will be used as a primary example describe herein. Examples of resources that may be accessed include, for instance, databases, servers, storage, files, directories, and so forth. There is also a bridging infrastructure 230 to be used by the application 211A in the public cloud 210 in order to access the resource 221A in the private network 220. The arrows 231 through 238 represent an example data flow associated with the use of the bridging infrastructure 230 and will be described further below in conjunction with FIG. 7.

As illustrated in FIG. 3, there are three temporal stages 300 associated with the bridging infrastructure. The provisioning stage 310 is followed by the connecting stage 320, which is followed by the use stage 330. The purpose of the provisioning stage 310 is to make the connection stage 320 easier and more automatic to perform. In fact, the connection stage 320 may be deferred until just prior to the use stage 330, at which time the public cloud actually uses the bridging infrastructure 230 in order to communicate with the on-premises resource 221A.

FIG. 4 illustrates a flowchart of a method 400 for automatically provisioning a connection between a public cloud and an on-premises resource in a private network. The method 400 is one example of the provisioning stage 310 of FIG. 3. As the method 400 may be performed in the network environment 200 of FIG. 2, the method 400 of FIG. 4 will now be described with frequent reference to FIG. 2.

The method 400 is initiated upon determining that an application running in the public cloud is to access an on on-premises resource of the private network (act 401). For instance, a user within the private network 220 may determine that the application 211A of the public cloud 210 is to access resource 221A of the private network 210. For instance, application 211A may require access to the resource 221A located within the private network 220 to serve information or to process requests. Such intent to access the remote resource may be indicated or configured by the developer of application 211A during application development. Alternatively, this intent may be determined during deployment or configuration of the application 211A by the administrator.

The method 400 is performed by automatically performing the content below line 410 upon the user specifying the intent to access the on-premises resource. These steps may be automatically initiated upon interaction with a control, such as a hyperlink. Alternatively, these steps may be explicitly initiated by a user or the application developer. Specifically, a bridging structure is identified that can be used to provide access to the on-premises resource (act 411). The bridging infrastructure may be provisioned on a bridging or a relaying service designed for this purpose as part of the public cloud. Accordingly, the bridging infrastructure is associated with the network identity of the on-premises resource.

The credentials used to connect to the bridging infrastructure are then accessed. This includes the application-specific credential 251 with the send rights being provided to the second control (act 415) that is embedded in the runtime of application 211A in the public cloud 210 (act 415). For instance, in FIG. 2, the resource-specific credential 241 may be used to establish a first control 242 that connects the bridging infrastructure 230 with the on-premises resource 221A. The application-specific credential 242 may be used to establish a second control 252 that connects the bridging infrastructure 230 with the application 211A.

Furthermore, the method 400 includes accessing a resource-specific credentials (act 412) for the bridging infrastructure, provisioning this an executable for a control 242, and providing it the identity of the on-premises resource. The control may take the form a proxy that is embedded in the private network (act 414). The control 242 is configured to provide connectivity between the on-premises resource on private network and the bridging infrastructure using the resource-specific credentials. In other words, the resource-specific credentials and the identity of the on-premises resource are used to configure the first control 242.

Accordingly, upon completion of the method 400, the private network 220 of the environment 200 has resource-specific credentials 241 with receives rights, and a control 242 that may be interacted with (in the context of having the resource-specific credentials 241) in order to establish a connection between the resource 221A and the bridging infrastructure 230 with send rights. Furthermore, the public cloud 210 has application-specific credentials 251, and a control 252 that may be used by the public cloud (in the context of having the application-specific credentials 251) in order to establish a connection between the application 211A and the bridging infrastructure 230.

The method may be performed multiple times for different resources in the private network 220 order to establish a different bridging infrastructure for each on-premises resource. There might be a different resource-specific control for each resource. In some embodiments, if multiple applications are to use the same on-premises resource, the corresponding control 242 may be shared by multiple applications running in the public cloud. There also might be a different application-specific control for each application connecting to the on-premises resource. In some embodiments, if multiple applications are to use the same on-premises resource, they may share the same control 252. Ellipses 225 represent that similar bridging infrastructures may be established between the public cloud 210 and other private networks as well.

Figure 5:
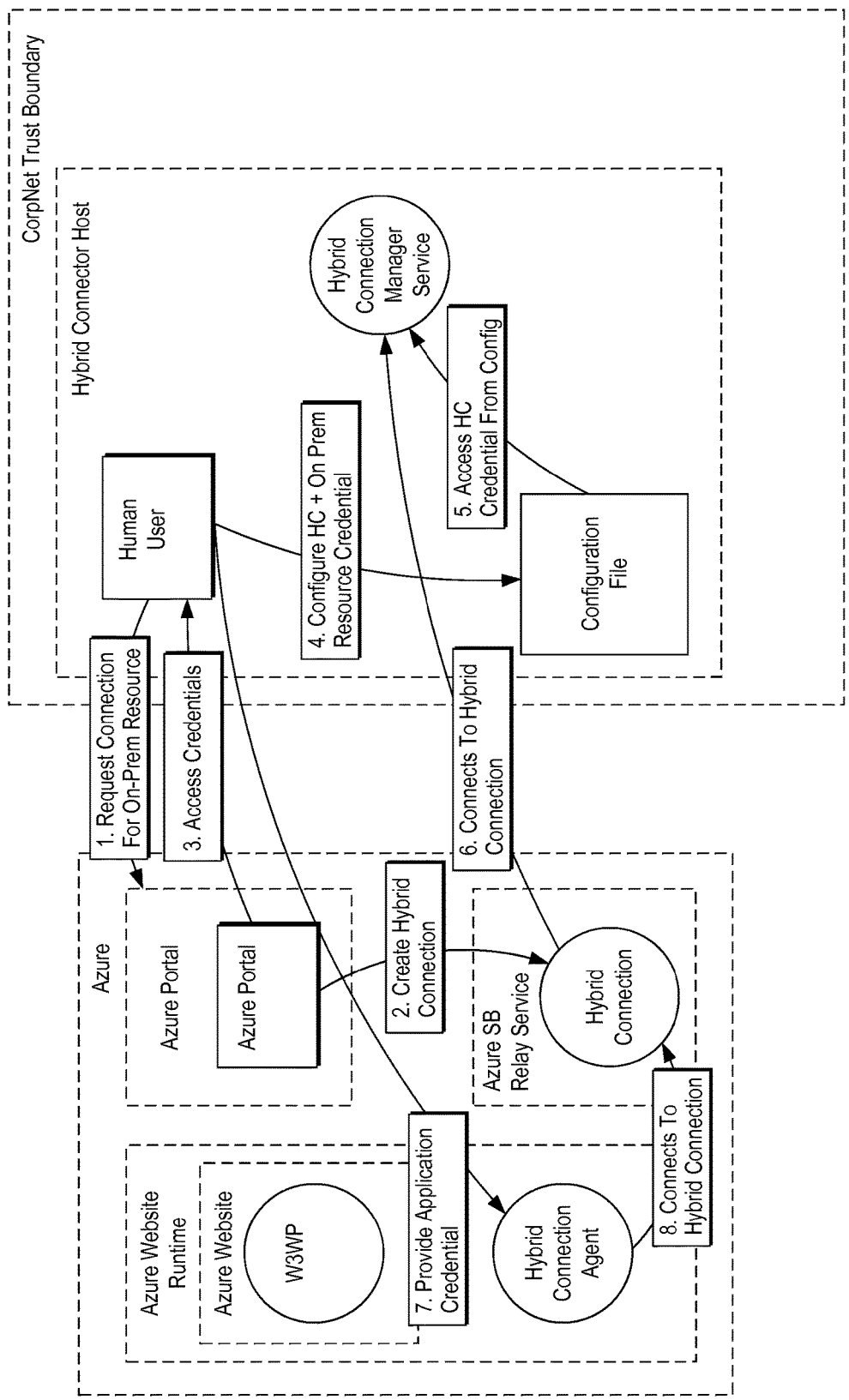
FIG. 5 illustrates a specific example of data flows associated with provisioning a connection between a public cloud and an on-premises resource in a private network.

FIG. 5 illustrates an example environment in which the bridging infrastructure is provisioned with the resource proxy control 242 set up to be hosted in the private network. In this diagram, a public cloud is labelled as "Azure". However, the principles described herein may be applied to any public cloud to enable connectivity with resources in a private network, regardless of the provider or identity of the public cloud. The trust boundary of the private network is labelled as "Corpnet Trust Boundary". The bridging infrastructure used to connect the public cloud and the private network to allow the application in the public cloud to access the resource in the private network will be referred to herein as a "hybrid connection".

First, the user creates a logical hybrid connection specifying the network address of the remote resource on the private network. This automatically generates two credentials; a first credential (i.e., the resource-specific credential) with receive rights on the on-premises proxy, and a second credential (i.e., the application-specific credential) with send rights for the application on the public cloud.

The user then deploys and configures the proxy service ("hybrid connection manager CO Application" in FIG. 5) on the private network and provides it the credential with the receive right.

The proxy service on the private network then automatically starts. The proxy service uses the credential with the receive right to connect to the bridging infrastructure and determines which on-premises resource it is designed to proxy, and then configures itself as a proxy for that resource. Arrows 4 through 6 in FIG. 5 show how this might occur for a particular implementation, but other approaches may also be used for this.

The agent embedded in the application runtime on the public cloud is configured with a link to the desired logical hybrid connection representing the remote resource on the private network. The credential with the send right is configured on the agent, and the agent connects to the logical hybrid connection. Arrows 7 through 8 in FIG. 5 show how this might occur for a particular implementation.

Figure 6:
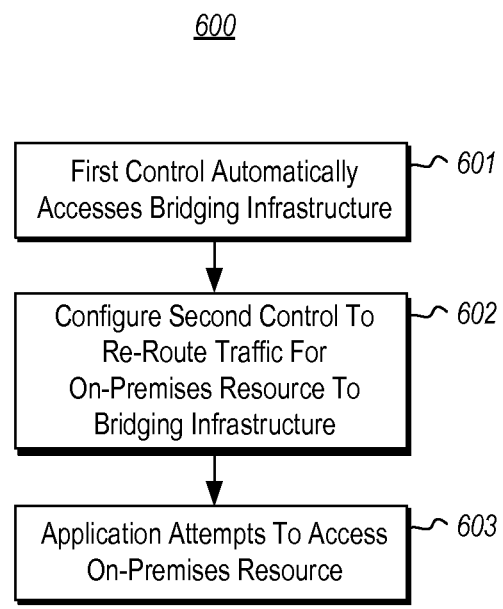
FIG. 6 illustrates a flowchart of a method for establishing access from a public cloud to an on-premises resource in a private network.

FIG. 6 illustrates a flowchart of a method 600 for establishing access from a public cloud to an on-premises resource in a private network. The method 600 may be performed as part of the connecting stage 320 of FIG. 3, and may be performed in the context of the environment 200 of FIG. 2. Accordingly, the method 600 of FIG. 6 will now be described with frequent reference to the environment 200 of FIG. 2.

The method includes automatically accessing (act 601) a bridging infrastructure that is to operate between the public cloud and the private network. For instance, referring to FIG. 2, the bridging infrastructure 230 is configured to interact with a user system within the private network 220 using a first control 242. The first control 242 is structured such that, when configured with the resource-specific credentials for the bridging infrastructure, the first control 242 automatically establishes a secure connection to the bridging infrastructure 230. When such a connection established, the first control 242 identifies the on-premises resource 221A that the bridging infrastructure 230 was provisioned to access. Further, the first control 242 is structured to receive intercepted traffic from the bridging infrastructure 230, where that intercepted traffic was forwarded onto the bridging infrastructure 230 by the second control 252. The first control 242 configures itself to forward intercepted traffic from bridging infrastructure 230 to resource 221A. The second control 252 likewise is configured to intercept traffic from the application 211A and destined for the on-premises resource 221A, framing it in an appropriate framing message and rerouting it onto the bridging infrastructure 230. Furthermore, the second control 252 is provided (act 602) to the application running in the public cloud 210. The second control 252 is structured such that the application 221A may securely connect via the bridging infrastructure 230 with an on-premises resource of the private network. The second control 252 may always maintain the connection with the bridging infrastructure 230 or alternatively the connection may be established on demand. If the connection is established on demand, then as application 211A attempts to access resource 221A (act 603), the second control 252 finalizes the communicative path between the application 211A and the on-premises resource 221A.

Figure 7:
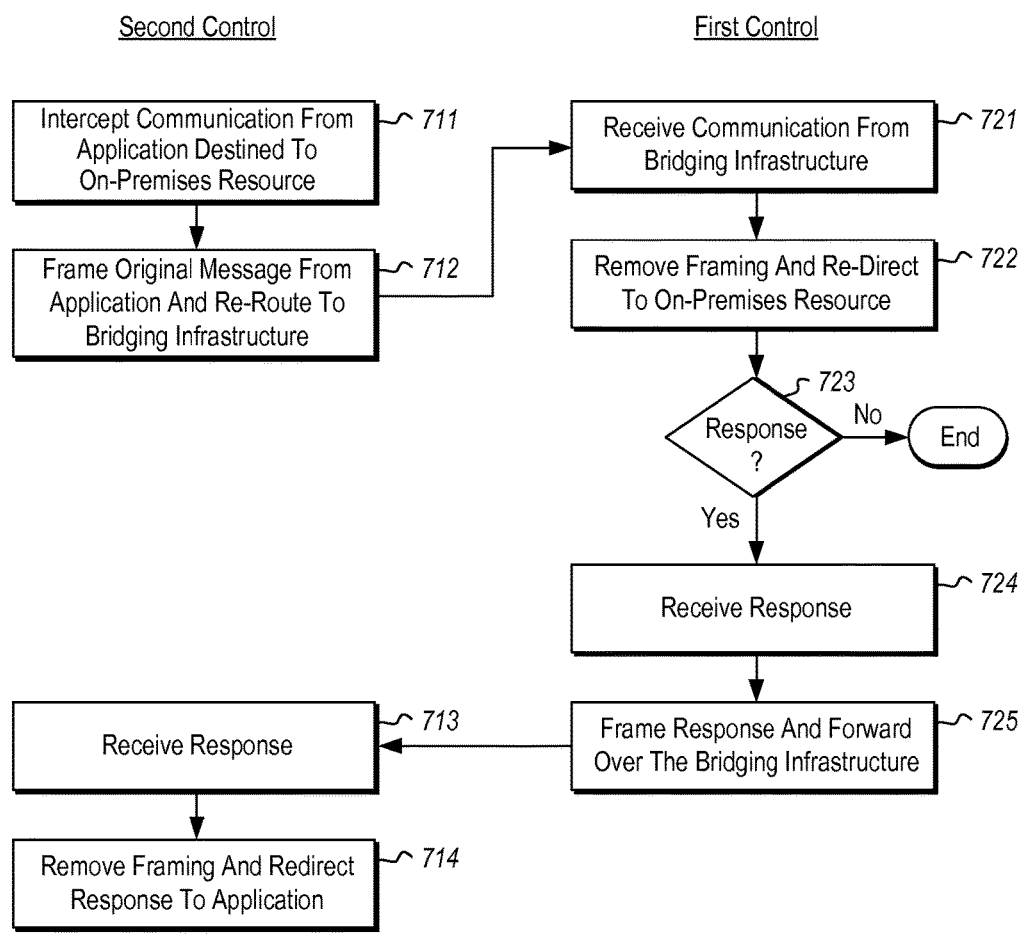
FIG. 7 illustrates a flowchart of a method for using the bridging infrastructure once connected to the application and the on-premises resource in the private cloud.

FIG. 7 illustrates a flowchart of a method 700 for using the bridging infrastructure once connected to the application and the on-premises resource in the private cloud. The method 700 represents an example of the usage stage 630 of FIG. 6. The method 700 may be performed within the environment 200 of FIG. 2 to cause a number of data flows 231 through 238 referenced in FIG. 2. Accordingly, the method 700 of FIG. 7 will now be described with respect to the environment 200 of FIG. 2. Acts performed by the second control are referenced in the left column of FIG. 7 under the heading ("Second Control") and are labelled in the 710s. Acts performed by the first control are referenced in the right column of FIG. 7 under the heading ("First Control") and are labelled in the 720s.

The second control first intercepts (act 711) a communication from the application that is destined for the on-premises resource. For instance, in FIG. 2, the second control 252 receives (as represented by arrow 231) the communication from the application 211A. This communication may be structured the same as would be if the resource were to be accessed from within the public cloud. Accordingly, the application 211A itself may be completely agnostic about where the resource is actually located. The existence of the communication channel established by the first control 242, the second control 252 and the bridging infrastructure 230 may be something that is abstracted away from the view of the application 211A.

The second control then frames the original message from the application 211A using an appropriate framing or tunneling mechanism and redirects (act 712) the communication over the bridging infrastructure for routing by the first control to the on-premises resource. Framing the original message preserves any message headers or other control information that may be required for access-control or to correctly process the original message by the on-premises resource. Of course this communication may be encrypted for security. For instance, in FIG. 2, the second control 252 is illustrated as redirecting (represented by arrow 232) the communication over the bridging infrastructure 230.

The first control then receives the redirected communication over the bridging infrastructure (act 721). For instance, in FIG. 2, the first control 242 is illustrated as receiving the communication (represented by arrow 233). The first control then removes the framing from the original message and redirects the communication to the on-premises resource (act 722). For instance, in FIG. 2, the first control 242 is illustrated as redirecting the communication (represented by arrow 234) to the on-premises resource 221A. If there is no response to the communication from the on-premises resource ("No" in decision block 723), then the method 700 may then end.

If there is a response to the communication ("Yes" in decision block 723), then the first control receives that response (act 724), frames it using the chosen framing mechanism and forwards that response over the bridging infrastructure (act 725). For instance, in FIG. 2, the first control 242 receives a response (as represented by arrow 235) from the on-premises resource 221A and redirects the response (as represented by arrow 236) onto the bridging infrastructure 230.

The second control receives the response (act 713) over the bridging infrastructure, removes the framing added by the first control and redirects the original response from the on-premises resource to the application 211A (act 714). For instance, in FIG. 2, the second control 242 receives the response (as represented by arrow 237) over the bridging infrastructure 230 and redirects the response (as represented by arrow 238) back to the application. In some embodiments, the response may appear the same or have the same schema regardless of whether the on-premises resource was within the public cloud or the private network.

Figure 8:
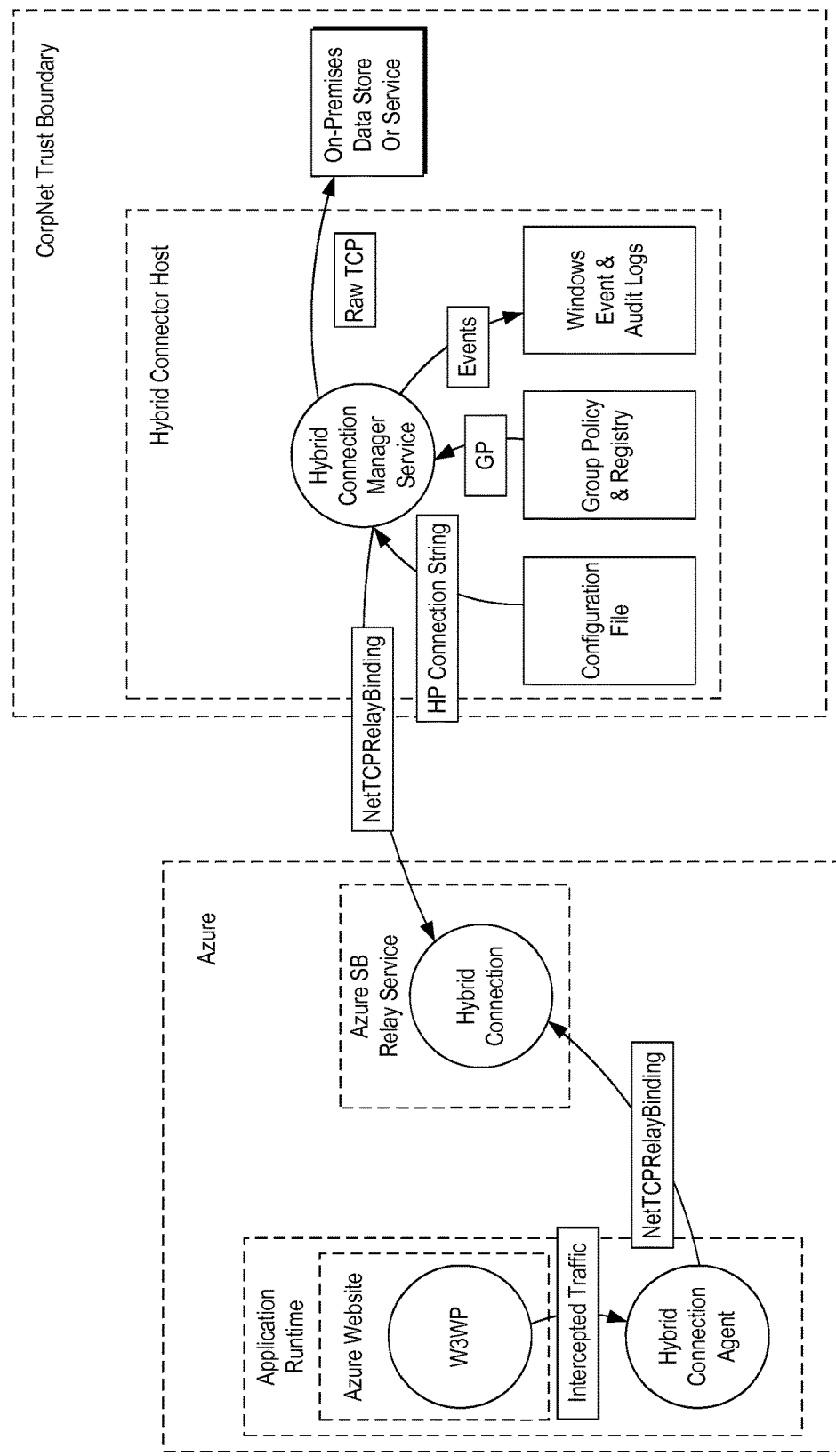
FIG. 8 illustrates a runtime process showing a more specific example of how the application in the public cloud may then access the resource on the private network using the bridging infrastructure.

FIG. 8 illustrates a runtime process showing a more specific example of how the application in the public cloud may then access the resource on the private network using the bridging infrastructure. In this case, the application is a website. Again, although the application is labelled as an "Azure" website, the principles described herein are not limited to any particular public cloud identity or provider, and is not limited to the application provider or identity that is requesting the private network resource. In any case, the application addresses a remote resource (which cannot be directly reached from the public cloud) just as if it were located proximally and if it were directly accessible:

The public cloud platform on which the application is hosted embeds an agent into the application runtime. The agent (the hybrid connection agent in FIG. 8) determines the logical hybrid connection to which the application is linked and the address/port information of the remote resource it represents. The agent intercepts all traffic from the application destined for that remote resource, uses the NetTcpRelayBinding for framing the original message and sends it to the hybrid connection. While the NetTcpRelayBinding is used in this specific example, other framing mechanisms or tunneling protocols may be used.

The hybrid connection forwards all requests sent by the application to the resource proxy ("hybrid connection manager service" in FIG. 8) hosted on the private network for further forwarding to the remote resource. Furthermore, the hybrid connection forwards to the application all responses sent by the remote resource.

The proxy service on the private network uses outbound network connectivity (e.g., over TCP, HTTP, HTTPS or WebSockets) to listen for connection requests from the public cloud. Connection requests from applications on the public cloud are then forwarded to the resource on the private network and responses are returned to the applications on the public cloud. The proxy removes the framing of the NetTcpRelayBinding from the original message before forwarding it to the resource, and conversely adds the framing when returning the response from the resource to the application.

Accordingly, the principles described herein provide a convenient and highly automated mechanism for provisioning, connecting and using a bridging infrastructure that allows an application in a public cloud to connect to an on-premises resource. The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for establishing access between an application on a public cloud and a first and second on-premises resources within a private network, the method comprising:

receiving, at a bridging infrastructure, a first request to establish access to the application, the first request being received from a first control configured as a proxy for the first on-premises resource;

transmitting the first request, from the bridging infrastructure, to a second control embedded in the runtime of the application, the second control being configured to securely connect the application with the first on-premises resource via the bridging infrastructure;

receiving, at the bridging infrastructure, a second request to establish access to the application, the second request being received from a third control configured as a proxy for the second on-premises resource; and transmitting the second request, from the bridging infrastructure, to a fourth control embedded in the runtime of the application, the fourth control being configured to securely connect the application with the second on-premises resource via the bridging infrastructure.

2. The method in accordance with claim 1, further comprising:

the application using the second control to securely connect via the bridging infrastructure with the first on-premises resource of the private network.

3. The method in accordance with claim 2, the application using the second control to securely connect via the bridging infrastructure with the first on-premises resource of the private network, comprising:

the second control intercepting a communication from the application that is destined for the first on-premises resource; and the second control redirecting the communication over the bridging infrastructure for routing by the first control to the first on-premises resource.

4. The method in accordance with claim 3, the application using the second control to securely connect via the bridging infrastructure with the first on-premises resource of the private network comprising:

the second control receiving a response to the communication over the bridging infrastructure; and the second control redirecting the response to the application.

5. The method in accordance with claim 1, the first on-premises resource being a server.

6. The method in accordance with claim 1, the first on-premises resource being a database.

7. The method in accordance with claim 1, the first on-premises resource being storage.

8. The method in accordance with claim 1, the second on-premises resource being a server.

9. The method in accordance with claim 1, the second on-premises resource being storage.

10. A method for on-premises resources in a private network to an application running in a public cloud, the method comprising:

automatically accessing a first bridging infrastructure operating between the public cloud and the private network, the first bridging infrastructure being configured to interact with a first on-premises resource on the private network using a first control within the private network, wherein the first control is structured for configuring as a first proxy for the first on-premises resource and to receive first intercepted traffic from the bridging infrastructure, automatically accessing a second bridging infrastructure operating between the public cloud and the private network, the second bridging infrastructure being configured to interact with a second on-premises resource on the private network using a second control within the private network, wherein the second control is structured for configuring as a second proxy for the second on-premises resource and to receive second intercepted traffic from the bridging infrastructure;

the first bridging infrastructure receiving the first intercepted traffic from a third control configured to reroute traffic destined for the first on-premises resource from the application on the public cloud, the third control being embedded in the runtime of the application on the public cloud; and the second bridging infrastructure receiving the second intercepted traffic from a fourth control configured to reroute traffic destined for the second on-premises resource from the application on the public cloud, the fourth control being embedded in the runtime of the application on the public cloud.

11. The method in accordance with claim 10, further comprises:

detecting user interaction with the first control so as to establish a connection between the bridging infrastructure and the on-premises resource.

12. The method in accordance with claim 10, further comprising:

the first control receiving a redirected communication over the bridging infrastructure from the second control; and the first control directing the redirected communication to the on-premises resource.

13. The method in accordance with claim 12, further comprising:

the first control receiving a response to the redirected communication from the on-premises resource; and the first control forwarding the response over the bridging infrastructure to the second control.

14. The method in accordance with claim 10, wherein the first bridging infrastructure is the same as the second bridging infrastructure.

15. The method in accordance with claim 10, wherein the first bridging infrastructure is different from the second bridging infrastructure.

16. One or more hardware storage devices having stored thereon computer-executable instructions that are structured such that, when executed by one or more processors of a computing system, cause the computing system to perform a method for establishing access from a public cloud to first and second on-premises resources in a private network, the method comprising:

automatically accessing a bridging infrastructure that is to operate between the public cloud and the private network, the bridging infrastructure being configured to interact with the private network using a first control that is configured as a proxy for the first on-premises resource for establishing a secure connection to the bridging infrastructure;

providing a second control to an application running in the public cloud, the second control being embedded in the runtime of the application, and being structured such that the second control is configurable for securely connecting, via the bridging infrastructure, with the first on-premises resource of the private network;

automatically accessing the bridging infrastructure that is to operate between the public cloud and the private network, the bridging infrastructure being configured to interact with the private network using a third control that is configured as a proxy for the second on-premises resource for establishing a secure connection to the bridging infrastructure; and providing a fourth control to the application running in the public cloud, the fourth control being embedded in the runtime of the application and being structured such that the fourth control is configurable for securely connecting, via the bridging infrastructure, with the second on-premises resource of the private network.

17. The one or more hardware storage devices of claim 16, wherein the bridging infrastructure comprises a first bridge and a second bridge.

18. The one or more hardware storage devices of claim 17, wherein automatically accessing the bridging infrastructure using the first control comprises automatically accessing the first bridge within the bridging infrastructure and automatically accessing the bridging infrastructure using the second control comprises automatically accessing the second bridge within the bridging infrastructure.

* * * * *